United States Patent [19]

Inou et al.

[11] Patent Number: 5,424,932

[45] Date of Patent: Jun. 13, 1995

[54] MULTI-OUTPUT SWITCHING POWER SUPPLY HAVING AN IMPROVED SECONDARY OUTPUT CIRCUIT

[75] Inventors: Kiyoharu Inou; Shuichi Matsuda, both of Tokyo, Japan

[73] Assignee: Yokogawa Electric Corporation, Tokyo, Japan

[21] Appl. No.: 36,990

[22] Filed: Mar. 25, 1993

[30] Foreign Application Priority Data

Jan. 5, 1993 [JP] Japan .................. 5-000276

[51] Int. Cl.[6] .......................................... H02M 3/335
[52] U.S. Cl. .................................... 363/21; 363/89; 363/127
[58] Field of Search ................. 363/20, 21, 84, 89, 363/123, 127

[56] References Cited

U.S. PATENT DOCUMENTS

| | | | |
|---|---|---|---|
| 4,347,559 | 8/1982 | Sturgeon | 363/21 |
| 4,609,982 | 9/1986 | Gohda | 363/89 |
| 4,945,465 | 7/1990 | Marinus et al. | 363/89 |
| 5,038,266 | 8/1991 | Callen et al. | 363/89 |
| 5,162,663 | 11/1992 | Combs et al. | 363/21 |
| 5,289,359 | 2/1994 | Ziermann | 363/21 |

*Primary Examiner*—Jeffrey L. Sterrett
*Attorney, Agent, or Firm*—Moonray Kojima

[57] ABSTRACT

A switching power supply wherein high speed switching and high output voltages are obtained by utilizing an auxiliary power supply and a synchronizing signal having a sawtooth shaped waveform, whereby delay time in a control signal to an FET switch is substantially reduced. The switching power supply comprises a secondary output circuit which is supplied with a square waveform voltage and utilizes an FET switch which controls the width of pulses chopped from the square waveform voltage and causes the output circuit to produce a direct current output voltage having a set value. The control signal to the FET switch is produced by a control circuit which is independently powered by the auxiliary power supply and supplied with the synchronizing signal.

6 Claims, 14 Drawing Sheets

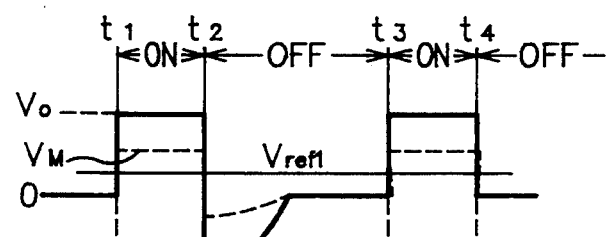
Fig.5 (1)
Fig.5 (2)
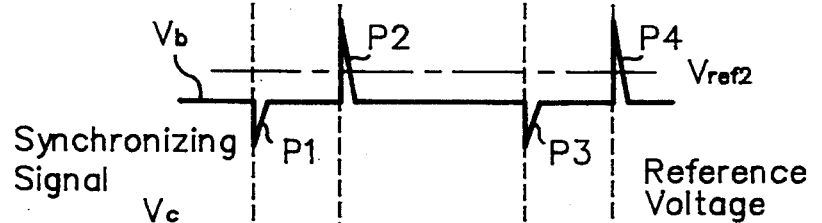
Fig.5 (3)
Fig.5 (4)
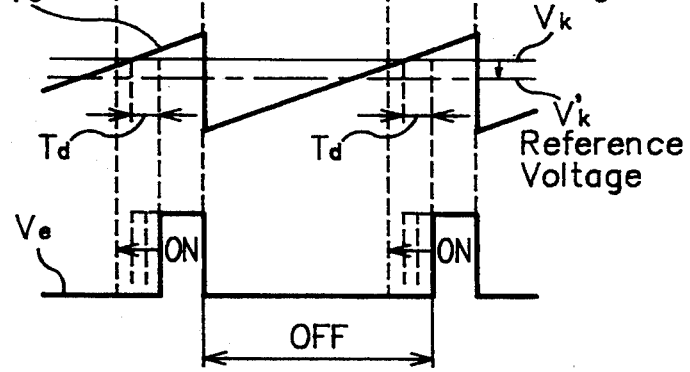
Fig.5 (5)

Fig.7 (1) VA 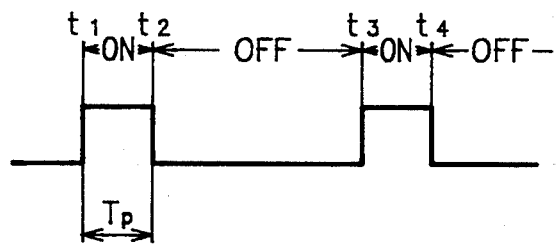
Fig.7 (2) VB 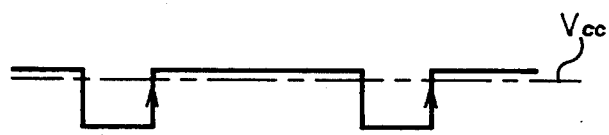
Fig.7 (3) Vc and Vk 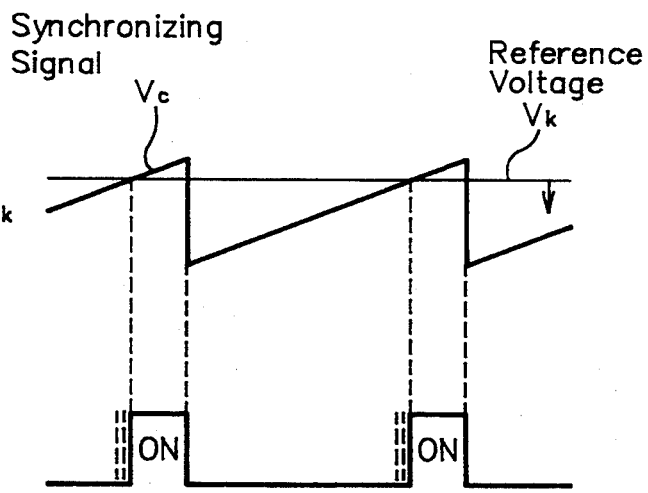
Fig.7 (4) Ve

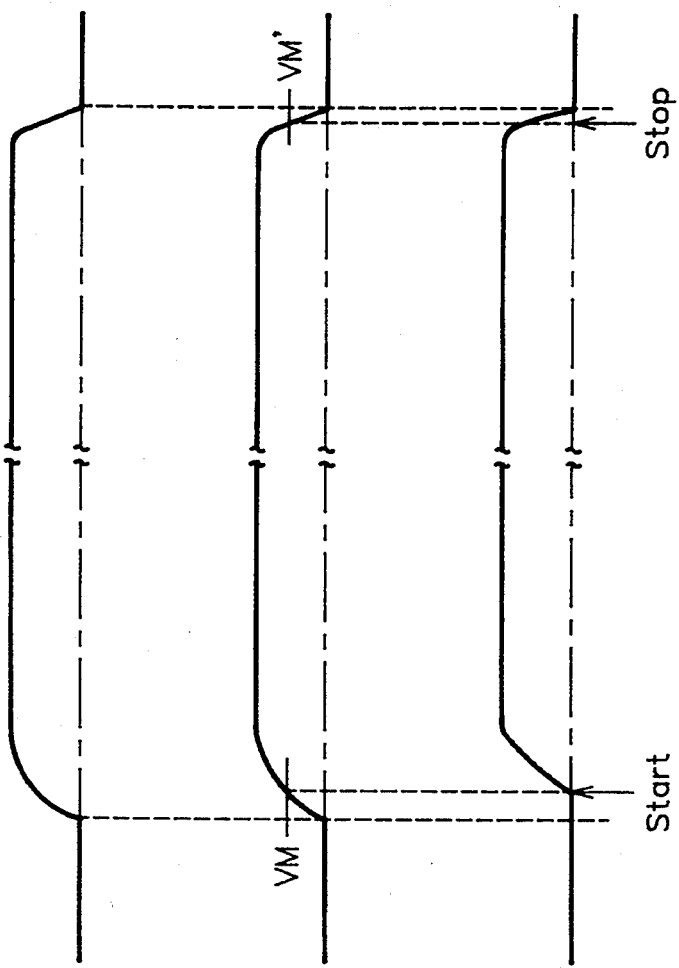

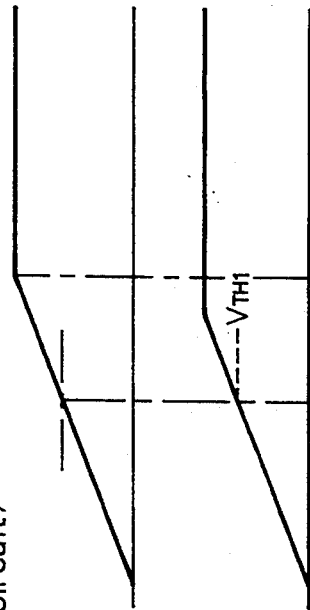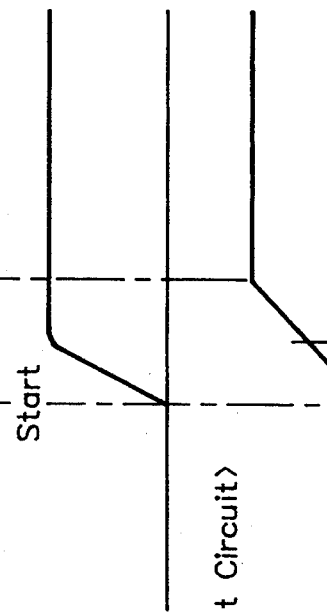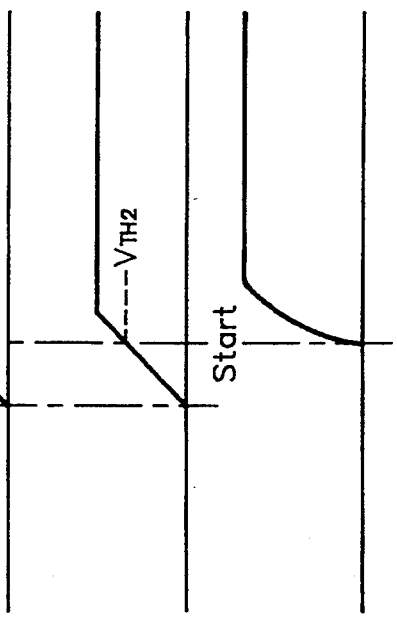
Fig.11 (1) ⟨Function of Primary Output Circuit⟩ $V_{in}$
Fig.11 (2) Output Voltage $V_{cc1}$ of Auxiliary Power Supply 22
Fig.11 (3) Primary Output Voltage $V_1$
Fig.11 (4) ⟨Function of Secondary Output Circuit⟩ Voltage $V_o$ of Primary Transformer
Fig.11 (5) Output Voltage $V_{cc2}$ of Auxiliary Power Supply 12
Fig.11 (6) Secondary Output Voltage $V_2$ Fig.12 (1) V_H 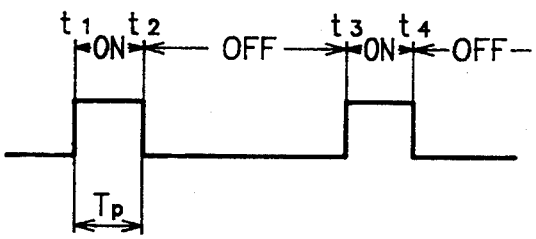
Fig.12 (2) V_c and V_k 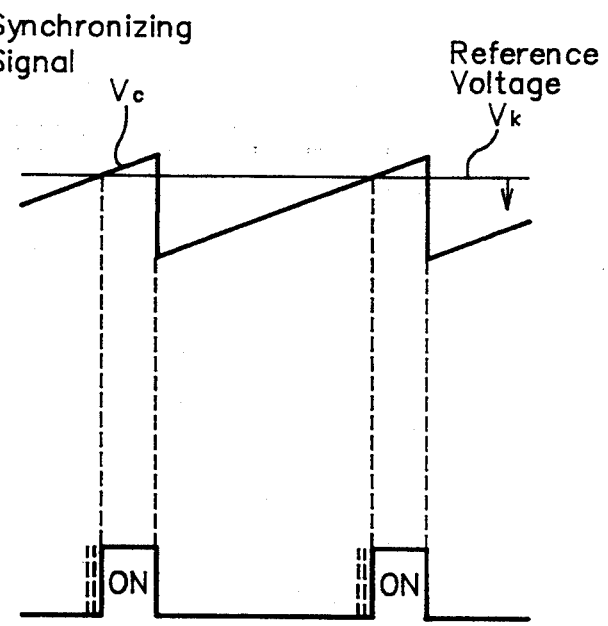
Fig.12 (3) V_e

MULTI-OUTPUT SWITCHING POWER SUPPLY HAVING AN IMPROVED SECONDARY OUTPUT CIRCUIT

BACKGROUND OF THE INVENTION

1. Field of Invention

This invention relates to a switching power supply which is provided with a primary output circuit and a secondary output circuit and which is capable of outputting a plurality of D.C. voltages; wherein a D.C. output voltage of a set value is obtained by controlling the widths of pulses obtained from a square waveform voltage supplied to the secondary output circuit; and more particularly, to an improvement of the secondary output circuit.

2. Description of the Prior Art

FIG. 1 shows an example of a conventional multi-output switching power supply provided with a primary output circuit and a secondary output circuit. FIGS. 2(1)-2(3) show waveforms of signals at different parts of the FIG. 1 circuit.

The primary output circuit 1 is an output circuit for supplying a voltage V1 which serves as the basis for a signal S1 for controling a main switch Q1 on the primary side of transformer T1.

Control circuit 3 outputs a pulse width signal which renders output voltage V1 of primary output circuit 1 equal to a set voltage (not shown), thus controlling the duty ratio of switch Q1, that is the ON rate of Q1 per unit time. As a result, a voltage Vw3 whose duty ratio has been changed is induced in secondary winding W3. Voltage Vw3 is rectified and smoothed, and its duty ratio stabilized at points where primary output voltage V1 of the circuit and the set voltage are uniform. Primary output circuit 1 comprises a secondaary winding W3, a diode D1, for rectifying the voltage induced in secondary winding W3, a smoothing circuit comprising a choke coil L1 and a capacitor C1, and a diode D2 for discharging the energy stored in choke coil L1. The value of output voltage V1 of primary output circuit 1 is isolated by a photocoupler 2, and is fed to the primary side of transformer T1.

Secondary output circuit 10 is a circuit connected to secondary winding W2 of transformer 1, which is wound separately from winding W3, and obtains a DC. voltage V2 from voltage induced in winding W2.

The duty ratio of the voltage Vo of winding W2 changes according to input voltage Vin or load current Iout of primary output circuit 1. Incidently, whenever we use the word "duty ratio" it means the voltage ratio which results in a device's ON rate per unit time. Going back to the duty ratio of voltage Vo if countermeasures are not taken, DC output voltage V2 of secondary output circuit 10 will fluctuate. Accordingly, secondary output circuit 10 is generally provided with means for stabilizing secondary output voltage V2. In FIG. 1, the stabilizing means comprises a synchronizing signal generator 6, a control circuit 5, a drive transformer T2, a drive circuit 4, and an FET switch Q2. "FET" means field effect transistor, as used herein.

In FIG. 1, induction voltage Vo (also see FIG. 2(1)) of winding W2 is rectified by diode D3 and supplied to switch Q2. The ON/OFF functions of FET Q2 are controlled by drive circuit 4. The amount of voltage passing through FET Q2 is smoothed by choke coil L2 and capacitor C2, and such voltage then becomes the secondary output voltage V2 which has reduced ripples. Diode D4 discharges the energy soted in choke coil L2 during the OFF periods of FET Q2.

The stability of voltage V2 is achieved by appropriately chopping, in FET Q2, the pulse width (see FIG. 2(1)) of induction voltage Vo from winding W2, and supplying the resulting signal to the smoothing circuit comprising choke coil L2 and capacitor C2.

The control of FET Q2 is achieved as follows, with reference being made to FIGS. 2(1)-2(3). An FET Q3, connected to control circuit 5, carries out switching operations, while a transformer T2 carries out level changes of output Va of control circuit 5.

The circuit of FIG. 1 operates as follows. A DC voltage Vin is generated at both ends of capacitor C3, and the ON/OFF functions of switching element Q1 are controlled by control circuit 3. Accordingly, a voltage is intermittently supplied to primary winding W1, with the result that an induction voltage is generated in windings W2 and W3.

Primary output voltage V1, obtained from primary output circuit 1, is fed back to the primary side of transformer T1 via the photocoupler 2. Then, a pulse width modulation signal S1 is produced in control circuit 3 for conforming primary output voltage V1 to a set voltage (not shown), and the duty ratio of the primary siwtch FET 01 is controlled based on signal S1.

The duty ratio of voltage Vo, induced in the secondary winding W2, fluctuates according to input voltage Vin or the load current Iout of primary output circuit 1. This is because, when input voltage Vin decreases, in order to uniformly maintain primary output voltage V1, the duty ratio of primary switch FET Q1 is increased. In other words, by increasing the rate at which FET Q1 is switched ON, due to the reduction of voltage Vin, the amount of current supplied to winding W3 is compensated for.

Also, if load current Iout of primary output circuit 1 increases, in order to maintain uniformity of voltage V1, the duty ratio of FET Q1 also is increased.

Consequently, the duty ratio of the induction voltage from winding W2, which is wound about the same core as winding W3, is also increased.

Where the duty ratio of the induction voltage from winding W2 fluctuates, if countermeasures are not taken, output voltage V2 will also fluctuate. Since fluctuation of output voltage V2 is a major problem, the circuit of FIG. 1 performs a control operation which makes the voltage V2 uniform.

Such control operation is as follows. As previously described, input voltage Vo supplied to secondary output circuit 10 has the shape of waveform shown in FIG. 2(1). Input voltage Vo is fed to synchronizing signal generator 6 which outputs a synchronizing signal Vc (see FIG. 2(3)) which is in a modified sawtooth waveform shape, only during time period Tp when the input voltage Vo (see FIG. 2(1)) is at a high level. Synchronizing signal Vc is synchronized to the switching waveform of the primary side of transformer T1. Synchronizing signal generator 6 detects the ON (i.e. high) state of induction voltage Vo (see FIG. 2(1)) of winding W2 and produces the above described modified sawtooth waveform. Control circuit 5 receives both synchronizing signal Vc, having the waveform of FIG. 2(3), and secondary output voltage V2, and produces a references signal VK (see FIG. 2(3)).

When secondary output voltage V2 of secondary output circuit 10 is higher than a set voltage (not shown), reference voltage VK (see FIG. 2(3)) produced by control circuit 5 increases. Control circuit 5 outputs a high level signal Va during the period when the value of synchronizing signal Vc shown in FIG. 2(3) is higher than the reference voltage VK produced within control circuit 5. Output signal Va is applied to and drives FET Q3 ON/OFF. The voltage on the primary side of transformer T2 is boosted and this boosted voltage is supplied to drive circuit 4.

More specifically, when secondary output voltage V2 is higher than a set voltage, reference voltage VK, shown in FIG. 2(3) increases. Consequently, the period when the value of synchronizing signal Vc is higher than the reference signal VK, i.e., the period when the FET Q2 is ON, is reduced. As a result, since the amount of voltage supplied to the smoothing circuit, comprising choke coil L2 and capacitor C2, also decreases, the value of voltage V2 decreases and approaches the set voltage value.

Conversely, when voltage V2 is lower than the set voltage, reference voltage VK decreases, and the operation described above occurs in reverse, i.e., the ON period of FET Q2 is increased, and since the amout of voltage supplied to smoothing circuit increases, voltage V2 also increases, and approaches the set voltage.

SUMMARY OF THE INVENTION

Generally, when driving an FET, it is necessary for the gate potential to be higher than the source potential by, for example, 4 volts or more. Since the FET source potential in the secondary output circuit is relatively high, in order to obtain a gate potential which is higher than the source potential, in conventional power supplies, such as shown in FIG. 1, the control signal supplied to the gate of the FET is boosted by the drive transformer, such as transformer T2 in FIG. 1. However use of such measure is disadvantageous in that the control signal is thus delayed when it passes through the drive transformer T2.

In order to solve the foregoing problem, the invention utilizes an auxiliary power supply which produces a voltage Vcc which is higher than the source potential of the FET. This voltage is supplied to a PWM (pulse width modulation) circuit, which then supplies a control signal to the FET. In this manner, the time delay present in conventional devices is significantly reduced or eliminated. In addition, the invention utilizes a square waveform voltage which is supplied in an efficient amount to the secondary output circuit and then passed through to a smoothing circuit, so that a high voltage secondary output is produced.

More specifically, although generally an MOS type FET is used as switch element Q2, if the gate potential of Q2 is not at least 4 volts higher than the source potential, the element Q2 cannot be driven ON. Also, in a general junction type FET, the gate potential must be higher than the source potential. Furthermore, it is necessary to supply a signal, having a voltage which is at least 4 volts higher than point A in FIG. 1, to the gate of the FET Q2. However, point A is at a high potential side of secondary output circuit 10 so that in order to obtain a potential higher than at point A, a voltage increasing or boosting means is needed. In conventional power supplies, such as shown in FIG. 1, a drive transformer T2 is provided, as just discussed. The output voltage Va of control circuit 5 is supplied to the transformer T2, which then generates a voltage which is at least 4 volts higher than at point A and such higher voltage is then supplied to the gate of FET Q2.

As discussed, if drive transformer T2 is provided between drive circuit 4 and control circuit 5, disadvantageously, when pulse width signal Va passes through drive transformer T2, such signal is delayed. Referring to this time delay as Td (see FIG. 2(3)), generally, time delay Td is about 200 ns. Consequently, at a time TA, the value of synchronizing signal Vc is higher than reference voltage VK. It takes the amount of time Td from the time when control circuit 5 detects the signal to the time when Q2 actually reaches the ON state (see FIG. 2(2)).

Consequently, with respect to the input pulse width Tp (see the time period in FIG. 2(1)) supplied to secondary output circuit 10 (i.e. the pulse width of the output from transformer T1) the device of FIG. 1 can only supply the amount of signal of maximum pulse width (Tp–Td) to the smoothing circuit via Q2. If the switching frequency of the power supply of FIG. 1 is of a low frequency, of around 100 kHz (assuming the input pulse width Tp is about 3 microseconds), Td=200 ns<<Tp=3 μs. Therefore the delay time Td shown in FIG. 2(3) is relatively insignificant. However, in a low frequency switching power supply, the transformers and circuit elements are quite large. But, with the relentless drive to miniaturize, even switching power supplies are not being miniaturized and high switching frequencies are used.

However, in high frequency switching power supplies, since input pulse width Tp is small, the rate of delay time Td increases, and the delay time Td becomes quite significant. Specifically, in the case of high switching frequencies of say 300 kHz or more, (i.e. Tp<1 μs) wherein the input pulse width Tp is relatively large as compared to delay time Td, the rate of time delay Td increases. Consequently, if a large current is to be outputted from the secondary output circuit, the amount of voltage supplied to the smoothing circuit, comprising choke coil L2 and capacitor C2, will be small, thereby resulting in a situation whereby the output cannot be maintained.

The invention aims to solve the foregoing and other problems of the prior art.

Accordingly, a first object of the invention is to provided a switching power supply which can produce a set secondary output voltage which is effective with high frequency switching and which reduces the delay time of control signal used to control the ON/OFF states of the secondary output circuit FET.

A second object is to provide a switching power supply which maintains output even when the output current is large due to reduction in delay time of the signal used to control the FET.

A third objection is to provide a switching power supply which maintains output without limiting the voltage supplied to a smoothing circuit in the secondary output circuit even when the control signal has a small time delay and even when a large current is outputted.

BRIEF DESCRIPTION OF THE DRAWINGS

FIGS. 5(1)–5(5) are time charts depicting signals at different parts of the circuit of FIG. 4.

FIGS. 7(1)–7(4) are time charts depicting signals at different parts of the embodiment of FIG. 6.

FIGS. 8(1)–8(3) are time charts depicting operation of the embodiment of FIG. 6.

FIGS. 11(1)–11(6) are time charts depicting the starting operation of the embodiment of FIG. 10.

FIGS. 12(1)–12(3) are time charts depicting signals at different parts of the embodiment of FIG. 10.

DETAILED DESCRIPTION OF PREFERRED EMBODIMENTS

Figure 3:
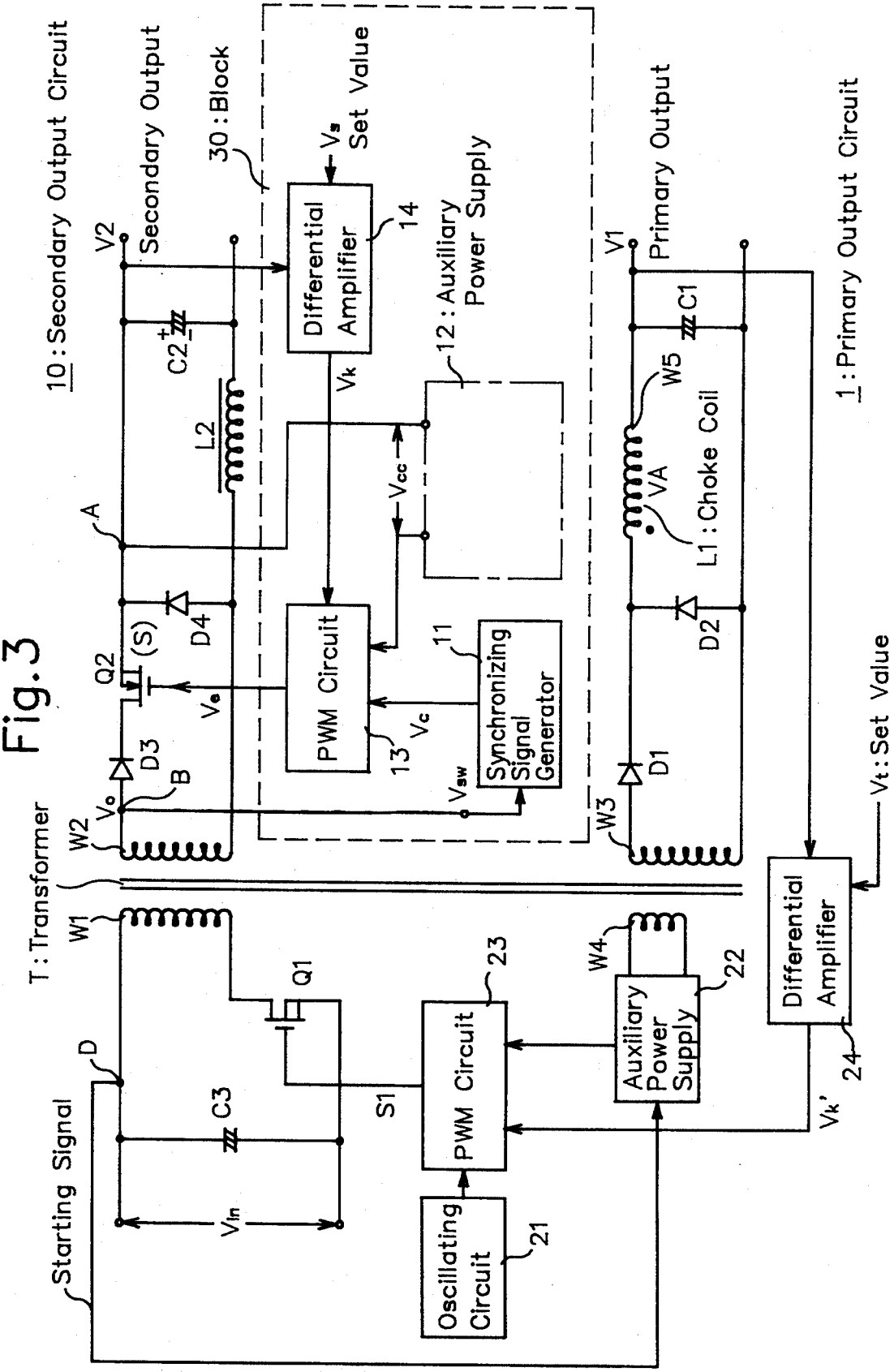
FIG. 3 is a block diagram depicting an illustrative embodiment of the invention.

In FIG. 3, a main switch FET Q1 disposed on the primary side of transformer T is switched ON and OFF by a pulse width signal S1 supplied by PWM (pulse width modulation) circuit 23. The switching frequency is determined by an oscillator circuit 21. A pulse voltage, induced in secondary winding W3, becomes a primary output voltage by operation of a diode D1 of primary output circuit 1, and a smoothing circuit comprising choke coil L1 and capacitor C1. Voltage V1 is then applied to a differential amplifier 24, where it is compared with a set voltage Vt, to determine the value of the primary output voltage V1.

The value of the output of differential amplifier 24 increases when the primary output voltage V1 is greater than the set voltage Vt. Conversely, when V1 is less than Vt, the amplifier output value decreases. On the other hand, when Vt is equal to V1, the output is stabilized by a given voltage level. The output is supplied to PWM circuit 23 as reference signal Vk'.

Differential amplifier 24, which generates reference signal Vk', may comprise a TL431 type integrated circuit (IC) which is sold by Texas Instrument Co., Inc.

Where the primary output circuit 1 connected to winding W3 and the left side circuit connected to winding W1 are isolated from each other, a photocoupler is provided in amplifier 24 and the reference signal Vk' is fed to PWM circuit 23 via the photocoupler.

Since PWM circuit 23 controls the duty ratio of pulse signal S1 on the basis of reference voltage Vk', primary output voltage V1 reaches a value equal to the set voltage Vt. An auxiliary power supply 22 generates a DC voltage from the voltage induced in winding W4 which is wound about transformer T core, and supplies this auxiliary power supply voltage to PWM circuit 23.

Secondary output circuit 10 will now be discussed. In FIG. 3, diodes D3 and D4, FET Q2, choke coil L2, and capacitor C2 have the same functions and effects as just described for similar elements in FIG. 1. That is, diode D3 functions to rectify voltage induced in winding W2; and choke L2 and capacitor C2 act as a smoothing circuit. Also, FET Q2, arranged between diode D3 and the smoothing circuit, controls the amount of voltage entering the smoothing circuit from winding W2 by an ON/OFF operation of the FET Q2.

Q1 and Q2 are capable of switching at several hundred kHz frequency and are FET's. But, other types of devices may be used. For example, insulated gate bipolar transistors (IGBT) or multipurpose transistors may be used provided they are capable of high speed switching utilizing an ON/OFF switching control signal.

Block 30, delineated by the dotted lines in FIG. 3, comprises cooperative elements which enable attainment of the above objects of the invention, and which comprises synchronizing signal generator 11, auxiliary power supply 12, PWM control circuit 13, and differential amplifier 14.

Synchronizing signal generator 11, receives as an input signal Vsw which repeats high and low states according the the ON/OFF states of primary switch Q1, and outputs a sawtooth shaped synchronizing signal Vc, which repeats a fixed gradient pattern from the time when the primary switch Q1 is switched OFF to the time the switch Q1 is switched OFF again.

Figure 2:
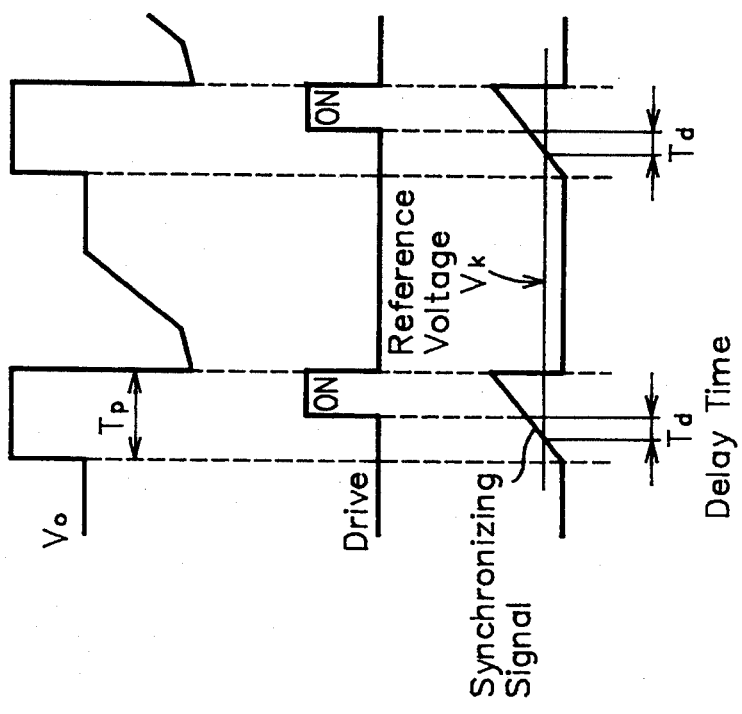
FIGS. 2(1)–2(3) are time charts depicting signals at different parts of the circuit of FIG. 1.

The difference between the synchronizing signal generator of the invention and a conventional synchronizing signal generator resides in the wave form of the output signals thereof. That is, the output signal Vc from the synchronizing signal generator of the invention has a full sawtooth shaped wave, such as shown in FIG. 5(4); whereas the output signal Vc of the conventional synchronizing circuit has the modified sawtooth wave form, such as shown in FIG. 2(3).

Signal Vsw, received as an input by generator 11, if it is a signal which repeats between high and low in accordance with the ON/OFF states of switch Q1, may be obtained from any point in the circuit of FIG. 3. For example, a signal may be obtained from point B at one end of the winding W2 in FIG. 3. Also, in FIG. 6 to be described later, inductance voltage VB of winding W5, wound about choke coil L1 of primary output circuit 1, may be used as signal Vsw. Furthermore, in FIG. 10, to be described later, the inductance voltage VH from winding W8, wound about choke coil L2 of secondary output circuit 10, may be used as signal Vsw.

Differential amplifier 14 receives as inputs secondary output voltage V2 and set voltage Vs, for setting the value of the output voltage V2, and outputs reference signal Vk. Differential amplifier 14 performs the same functions as differential amplifier 24 just described, and may have the same structure. That is, secondary output voltage V2 is applied to differential amplifier 14 where it is compared with a set value voltage Vs. Amplifier 14 then outputs a reference voltage Vk to PWM circuit 13. The value of reference voltage Vk increases when secondary output signal V2 is greater than set voltage Vs. Conversely, when V2 is less than Vs, reference signal Vk decreaes. When Vs equals V2, the value of Vk is stabilized at a given voltage level.

Figure 6:
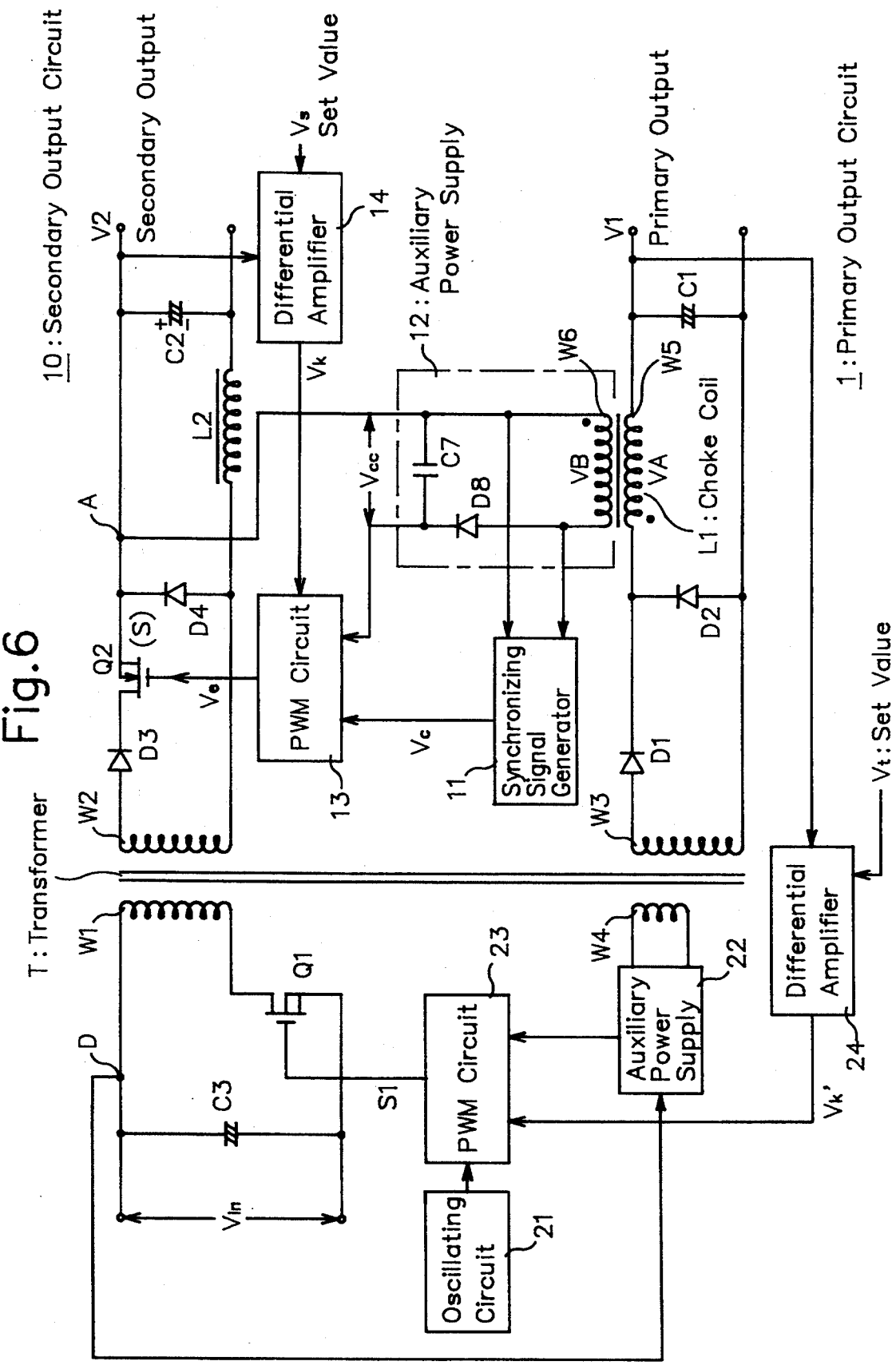
FIG. 6 is a block diagram depicting another illustrative embodiment of the invention.
Figure 10:
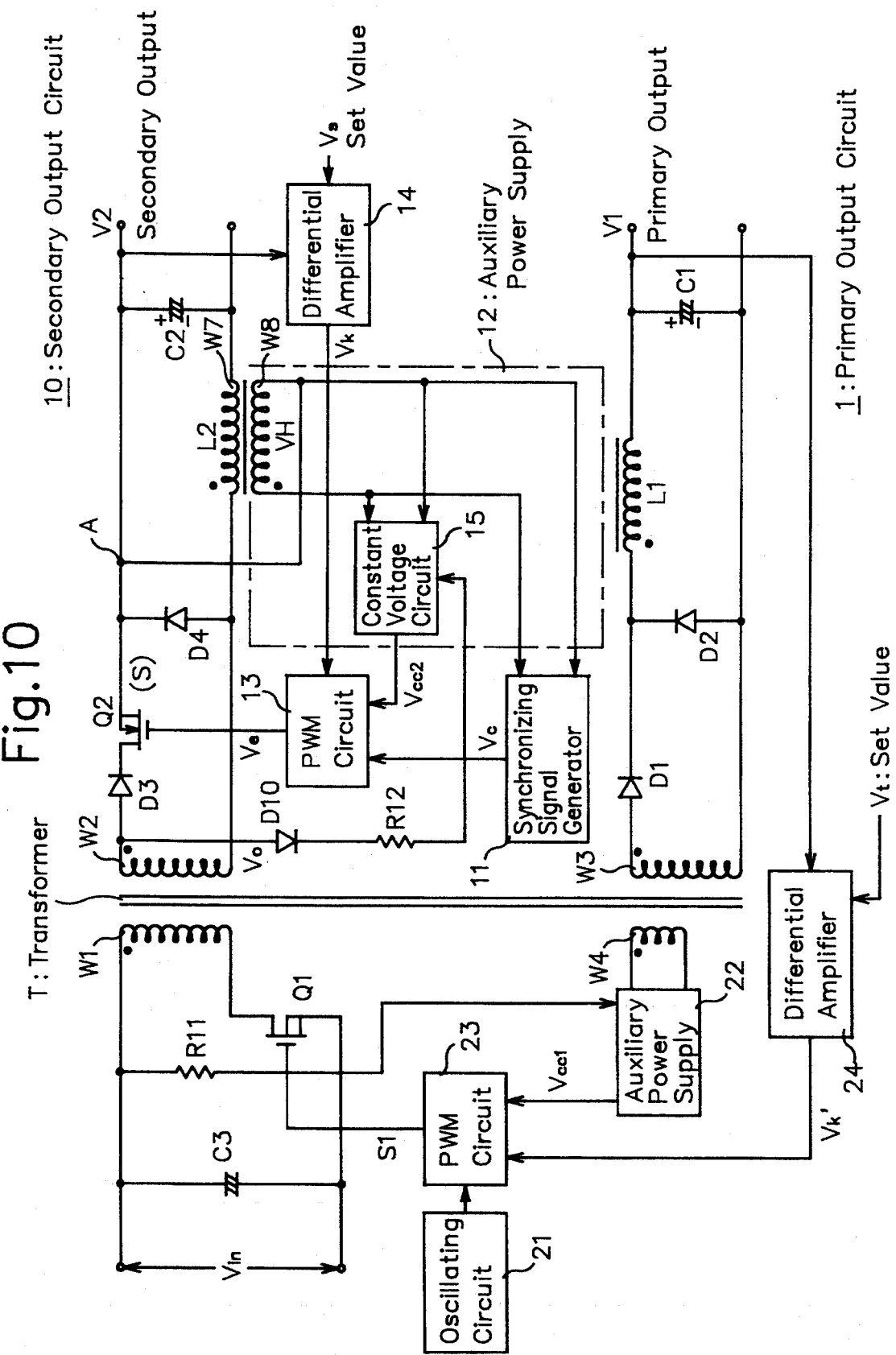
FIG. 10 is a block diagram depicting a further illustrative embodiment of the invention.

Auxiliary power supply 12 generates a DC voltage Vcc which has a voltage level higher than the potential at the source , i.e. point A, of FET Q2 and is thus able to drive ON the FET Q2. Auxiliary power supply 12 can have any type of structure provided it can output a DC voltage Vcc having the voltage level above that of the source potential, as discussed above. But, in this case, the structure shown in FIG. 6 or FIG. 10, is preferable. When it is desired to generate a voltage which is higher than the potential at the source, i.e. at point A, of FET Q2, the auxiliary power supply shown in FIG. 3 receives the potential at point A as an input. Also, a line is provided connecting point D of first winding W1, which acts as a starter circuit, to auxiliary power supply 22, and serves to supply a starter signal voltage when auxiliary power supply 22 is to be started.

PWM circuit 13 makes DC voltage Vcc, obtained from auxiliary power source 12, a power source voltage, and receives synchronizing signal Vc as an input from synchronizing signal generator 11 and reference signal Vk from differential amplifier 14. PWM circuit 13 then compares which of the two signals Vc and Vk, received as inputs, is high and low and applies the resultant signal Ve directly to the gate of FET Q2, thereby driving Q2 ON or OFF.

For example, when comparing the two signals Vc and Vk, if Vc is greater than Vk, PWM circuit 13 sets the output Ve high, and if Fc is less than Vk, PWM circuit 13 sets the output Ve low. This type of function can be easily realized by using a known comparator.

The operation of the embodiment of FIG. 3 will now be described with reference to FIGS. 4, and 5(1)-5(5).

A first feature of the embodiment of FIG. 3 is that a drive transformer (see transformer T2 of FIG. 1) is not used to obtain a signal for driving FET Q2; instead, in the invention, a DC voltage Vcc is produced in auxiliary power supply 12, and control signal Ve for controlling FET Q2 is generated in PWM circuit 13 which utilizes the DC voltage Vcc as a power supply.

A second feature of the embodiment of FIG. 3, as shown in FIG. 5(4), is that the waveform of the synchronizing signal Vc, between the times when primary switch Q1 is turned OFF and when Q1 is turned OFF again, is a repeating fixed gradient waveform, that is it is a sawtooth shaped wave. Also, auxiliary power supply 12, because it receives the potential as an input from point A in FIG. 3, can supply a voltage Vcc which is higher than point A, as a power supply to PWM circuit 13. Consequently, since PWM circuit 13 can apply a voltage which is approximately Vcc higher than point A, to the gate of FET Q2, such PWM circuit 13 can drive FET Q2 directly without going through a drive transformer, such as done in the conventional power supply of FIG. 1. The power source for the auxiliary power supply 12 can be taken from choke coil L1, as shown in FIG. 6, or from choke coil L2 as shown in FIG. 10.

The synchronizing signal generator 11 and PWM circuit 13 operate as follows, with reference being made to FIG. 4, which shows an exemplary synchronizing signal generator 11, and to FIGS. 5(1)-5(5) which show the signal waveforms. Signal Vsw in FIG. 4 will be assumed to have been introduced from point B in FIG. 3.

Figure 4:
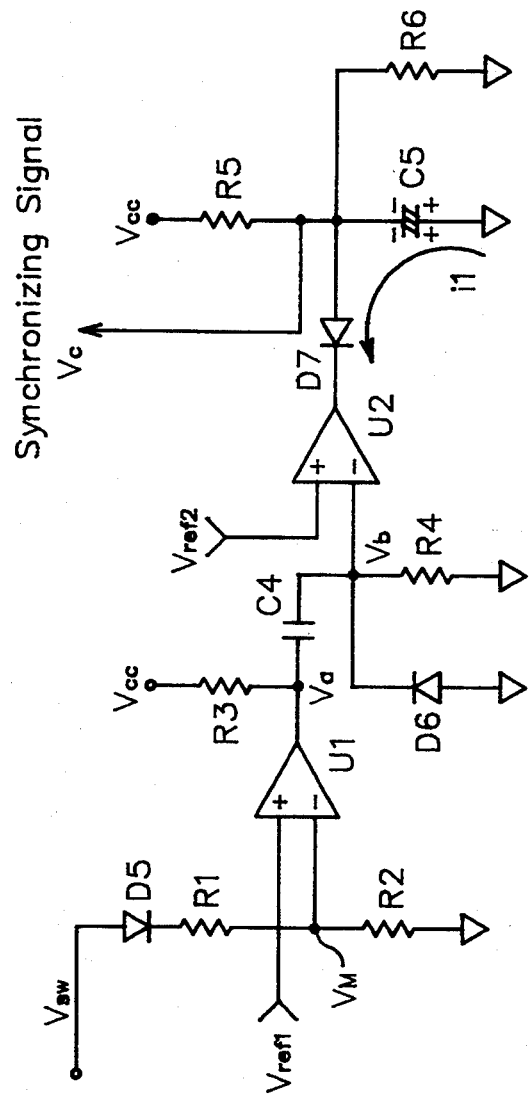
FIG. 4 is a circuit diagram depicting a synchronizing signal generator used in the invention.

In FIG. 4, an OFF timing detector is shown comprising a comparator U1, diodes D5, D6, capacitor C4 and resistors R1-R4, and having an input of reference voltage Vrefl. The detector detects the OFF timing of primary switch Q1.

Also shown is a waveform generator comprising a comparator U2, having as a reference voltage Vref2, a diode D7, resistors R5, R6, and a capacitor C5.

Winding W2 generates the switching waveform shown in FIG. 5(1), wherein period T1 to t2, and period t3 to t4, are periods during which primary switch Q1 is turned ON, and the period t2 to t3 is the period during which primary switch Q1 is turned OFF.

The output voltage Vo is equal to Vsw of winding W2 and is shown in FIG. 5(1) Voltage Vo is rectified by diode D5 of FIG. 4, divided by resistors R1 and R2, and applied to comparator U1. Comparator R1 compares reference voltage Vrefl, applied to an input (+) terminal of comparator U1, and divided voltage Vm which is applied to an input (−) terminal of comparator U1. The divided voltage $Vm=(R2 \cdot Vo)/R1+R2)$. As a result, comparator U1 outputs the waveform shown in FIG. 5(2). In other words, wave Va is a square shaped wave whose polarity is reversed at edges t1, t2, t3, etc, of the waveform of FIG. 5(1), which is the waveform of winding W2.

Since the output signal Vs of comparator U1 is differentiated by capacitor C4, a differential waveform Vb, shown in FIG. 5(3), synchronized with the edges of output voltage Vo of winding W2 (see FIG. 5(1)) is applied to an input (−) terminal of comparator U2. Pulses P2 and P4, of differential waveform Vb, are generated and synchronized with the OFF timing of primary switch Q1. Thus, if an excessive minus input is applied to the input (−) terminal of comparator U2 from diode D6, comparator U2 is protected from damage.

Comparator U2 receives as inputs at the input terminal (−) thereof differential pulses P1, P2, P3, etc as shown in FIG. 5(3), and at the input terminal (+) thereof reference voltage vref2, and compares the two. When differential pulses P2 and P4 are generated, reference voltage Vref2 is less than the high values of differential pulses P2 and P4. Thus, the output of comparator U2 is rapidly changed to a minus potential. Accordingly, in the circuit comprising capacitor C5 and diode D7, a current I1 flows as shown in FIG. 4, and the charge stored in capacitor C5 is discharged.

In comparator U2, when the differential pulse P2 disappears, the potential at the input (+) terminal thereof becomes higher than the potential at the input (−) terminal thereof. Thus, the output of comparator U2 reaches an even higher level. Consequently, diode D7 is turned OFF, and the potential of capacitor C5 increases in a uniform gradient to the potential divided by resistors R5 and R6 connected between the common potential of capacitor C5 and power supply Vcc. In other words, signal Vc, which is the voltage of capacitor C5, becomes a sawtooth shaped wave which rises in a fixed gradient (see FIG. 5(4)). The maximum voltage and gradient of the synchronizing signal Vc of FIG. 5(4) is determined by the values of resistors R5 and R6, and the capacity of capacitor C5.

If the next trailing edge of output voltage Vo of winding W2 is generated and differential pulse P4 is applied to comparator U2, at time t4 the operation above described is repeated and the waveform shape of signal Vc suddenly drops to a minus potential and from there rises at a fixed gradient. In this manner, the sawtooth shaped waveform of the synchronized signal shown in FIG. 5(4) is produced.

The secondary output circuit 10 of the embodiment of FIG. 3 operates as follows. As described previously, a switching waveform, such as shown in FIG. 5(1), is generated in winding W2, and the sawtooth shaped synchronizing signal Vc shown in FIG. 5(4) is outputted from synchronizing signal generator 11.

PWM circuit 13 compares reference voltage Vk, which changes in the manner above describe, and synchronizing signal Vc (see FIG. 5(4)). When reference voltage Vk is less than the value of synchronizing signal Vc, a control signal Ve, having the waveform shown in FIG. 5(5), is applied to the gate of FET Q2. When control signal Ve is high, FET Q2 is turned ON. In other words, PWM circuit 13 receives from auxiliary power supply 12 voltage Vcc which is sufficiently high to turn ON the FET Q2. Consequently, signal Ve, outputted from PWM circuit 13 has a voltage level which turns ON FET Q2.

Figure 1:
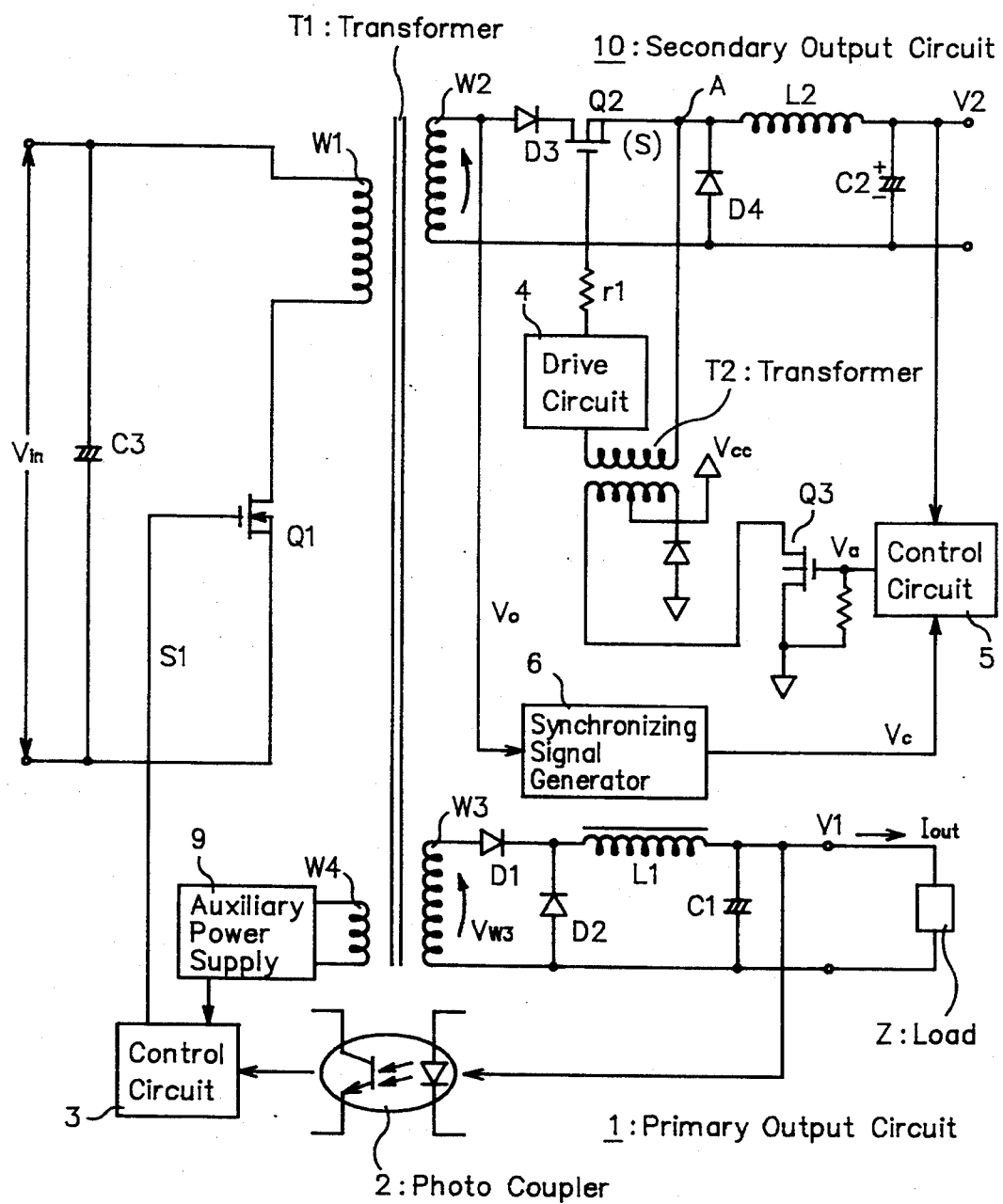
FIG. 1 is a circuit diagram depicting a conventional switching power supply.

The embodiment of FIG. 3 produces control signal Ve, such as shown in FIG. 5(5), without using a drive transformer, such as used in conventional devices, such as shown as transformer T2 in FIG. 1. Accordingly, there is very little time delay in control signal Ve, such as otherwise present in the conventional devices which use the drive transformer T2 of FIG. 1, for example.

Consequently, even if the switching frequency of the switching power supply is extremely high, the embodiment of FIG. 3 switches FET Q2 at the high frequency. In short, the embodiment of FIG. 3 achieves the above recited objectives of the invention.

Also, although the delay time of the FIG. 3 embodiment is greatly reduced from that of conventional devices, in order to decrease the effect of the delay time, in the invention, synchronizing signal Vc has a sawtooth shaped waveform comprising repeated fixed gradients rising from the time switch Q1 is turned OFF to the time switch Q1 is next turned OFF. Therefore, the entire input pulse width Tp, i.e. the total amount of signal inputted from winding W2 to secondary output circuit 10, can be accurately passed to the smoothing circuit, and the objects of the invention are advantageously attained.

The foregoing can be explained as follows. The ON state of FET Q2 is the time period during which reference voltage Vk is less than the value of synchronizing signal Vc (see FIG. 5(4)). Since the waveform of synchronizing signal Vc of the invention is sawtooth in shape, that Is, comprises a repeating fixed gradient waveform which occurs from the time primary switch Q1 reaches an ON state to the time switch Q1 reaches the next ON state, if the level of reference voltage Vk drops, the ON period of Q2 is then increased. In other words, because the voltage level of reference voltage Vk drops until the output voltage V2 of the secondary output circuit 10 equals set voltage Vs (see Vk' in FIG. 5(4)), the pulse width of signal Ve is widened (see FIG. 5(5)). That is, even if a delay time Td exists, since reference voltage Vk can be further decreased, the pulse width of signal Ve can be increased.

In comparison, in the conventional circuit of FIG. 1, the period during which the waveform of the modified sawtooth shaped synchronizing signal shown in FIG. 2(3) is generated, does not exist during the input pulse width period Tp. Thus, the smoothing circuit cannot be supplied with a signal via FET Q2 except within the pulse width Tp-Td, even at its maximum.

According to the embodiment of FIG. 3, since a drive transformer (see transformer T2 in FIG. 1) is not needed, advantageously, it is possible to greatly reduce the delay time of signal Ve which drives FET Q2. Accordingly, even if a high frequency circuit is constructed using a switch power supply, a large current can be obtained from the secondary output circuit 10. Also, because there is no need for such drive transformer, high frequency noise does not occur in at least one side of transformer T.

FIG. 6 depicts another illustrative embodiment wherein an exemplary auxiliary power supply 12 is shown. The FIG. 6 embodiment differs from the FIG. 3 embodiment in the following respects. (A) The components of auxiliary power source 12 are depicted as comprising a winding W6, a diode D8 and a capacitor C7. (B) Signal Vsw, inputted to synchronizing signal generator 11 is represented by signals supplied from the two ends of winding W6. The structure of generator 11 can be the same as that shown in FIG. 4.

Winding W6 is wound about the core of choke coil 1, disposed in the primary output circuit 1. One end of winding W6 is connected to point A at the source side of FET Q2. Winding W5, which forms choke coil L1 and winding W6 are wound in a flyback arrangement as shown in FIG. 6 (see the two dots of coil L1).

Synchronizing signal generator 11 receives as an input induction voltage VB from winding W6, and outputs a sawtooth shaped synchronizing signal Vc, which repeats at a constant gradient from when switch Q1 is turned OFF to when switch Q1 is next again turned OFF. The structure and operation of generator 11 have been discussed in FIG. 4.

Auxiliary power supply 12 produces a DC voltage Vcc, which is the result of rectifying and smoothing a square shaped voltage VB induced in winding W6 by use of diode D8 and capacitor C7. The DC voltage Vcc is a stabilized voltage, for the following reason. Primary output circuit 1 is controlled to a set voltage V1 by PWM circuit 23 on one side of transformer T. Accordingly, since the energy Va·Tp stored in winding W5 of coil L1 becomes fixed, the energy Vb·(Td−Tp) induced in winding W6 is fixed. Thus, DC voltage Vcc obtained by simply rectifying and smoothing voltage VB using diode D8 and capacitor C7, is a stabilized voltage. The DC voltage Vcc is Vcc volts higher than the voltage at point A. Features of the embodiment including the operation of the secondary output circuit 10 of FIG. 6 will be discussed hereinbelow with reference to FIGS. 7(1)–7(4).

Another feature of the embodiment of FIG. 6 is that another winding W6 is provided on choke coil L1 of primary output circuit 1 and a DC voltage Vcc which is higher than point A is obtained from winding W6.

A further feature is that the basic timing signal for producing synchronized signal Vc is obtained from voltage VB induced in winding W6.

Voltage VA having the wave shape shown in FIG. 7(1) is induced in winding W5 of choke L1. Time periods t1 to t2 and t3 to t4 are the periods when primary switch Q1 is turned ON, and the time period t2 to t3 is the period when primary switch Q1 is turned OFF. Windings W5 and W6 have a flyback arrangement, as depicted by the dots. Voltage VB from winding W6 (see FIG. 7(2)) is rectified and smoothed and primary voltage V1 is stabilized. Thus, a stable floating voltage Vcc (e.g. of 15 V) is obtained from auxiliary power supply 12. Also, since windings W5 and W6 are in a flyback relationship, during the time when choke coil L1 is OFF in relation to the primary output circuit 1, auxiliary power supply 12 operates so as to receive voltage (see FIG. 7(2)) as an input. Even if auxiliary power supply 12 is connected, there is no effect on the stability of the primary output voltage V1.

Since point A of FIG. 6 is connected to one output terminal of auxiliary power supply 12, supply 12 can supply to PWM circuit 13 a voltage Vcc higher than that at point A, as a power source voltage. Because PWM circuit 13 makes voltage Vcc a power source voltage, a control signal Ve of a voltage of about Vcc volts higher than point A is applied to the gate of FET Q2. Thus, the ON/OFF drive of FET Q2 is performed without a drive transformer being required, as is the case in the conventional devices, such as shown in FIG. 1.

Next, the operation of the general 11 and circuit 13 wil be discussed. Pulse VB having the waveform shown in FIG. 7(2) is applied to synchronizing signal generator 11. The pulse waveform VB represents the ON/OFF operation of switch Q1. Thus, generator 11, as already explained with reference to FIG. 4, with knowledge of the leading edges of waveform VB, can determine the state from the point where switch Q1 is turned OFF until the next point where switch Q1 is again turned OFF. Also, as previously explained, a sawtooth shaped signal Vc, which repeats a fixed gradient pattern, as shown in FIG. 7(3), is outputted.

PWM circuit 13 compares reference voltage Vk, which changes as described above, and snychronizing signal Vc, and the results thereof, as shown in FIG. 7(4), is a pulse width control signal Ve which is applied to FET Q2 and drives same ON and OFF.

In the embodiment of FIG. 6, the timing signal from which the synchronizing signal used to turn switch Q2 ON/OFF, is produced, is not obtained from winding W2. Rather, such timing signal is obtained from choke coil L1. Accordingly, the FIG. 6 embodiment has the advantage that the components thereof constituting generator 11 need not be of high tolerance.

Next the entire embodiment of FIG. 6 is operated as follows, with reference to FIGS. 8(1)–8(3). The initial operation of the FIG. 6 embodiment is as follows. First, immediately after DC voltage Vin is applied, FET Q, does not perform ON/OFF switching. Thus, transformer T does not generate an inductance voltage and auxiliary power supply 22 cannot supply a voltage to PWM circuit 23.

At this point, to start the embodiment of FIG. 6, the voltage at point D (i.e. the voltage at the terminal of capacitor C3) is introduced into auxiliary power supply 22. Accordingly, at the starting time, auxiliary power supply 22 produces a given voltage level with the voltage of point D, and supplies such voltage to PWM circuit 23, whereby PWM circuit 23 begins operation. When PWM circuit 23 begins operation, winding W4 generates an actual induction voltage, and auxiliary power supply 22 no longer requires the voltage from point D. Then, the DC current to be supplied to PWM circuit 23 is produced by an inductance voltage from winding W4.

In the just described manner, by initiating operation of PWM circuit 23, the ON/OFF operation of Q1 is started. As a result, when primary output voltage V1 rises, as shown in FIG. 8(1), and output voltage Vcc of power supply 12 also rises (see FIG. 8(2)). Then, voltage Vcc arrives at the possible operation voltage VM of PWM circuit 13 and PWM circuit 13 begins operation as described above (see "Start" shown in FIG. 8(3)) and the secondary output voltage V2 increases.

Stoppage of operation of the FIG. 6 embodiment is as follows. If the operation of PWM circuit 23 stops, the primary output voltage V1 drops, and secondary output voltage Vcc of auxiliary power supply 12 also drops. When voltage Vcc reaches the operational limit VM' of PWM circuit 13, PWM circuit 13 ceases operation (see FIG. 8(3)).

In this manner, primary output circuit 1 and secondary output circuit 10 are operated cooperatively. Also, advantageously, the input voltage Vin can be observed by observing the voltage VA of choke coil L1.

Figure 9:
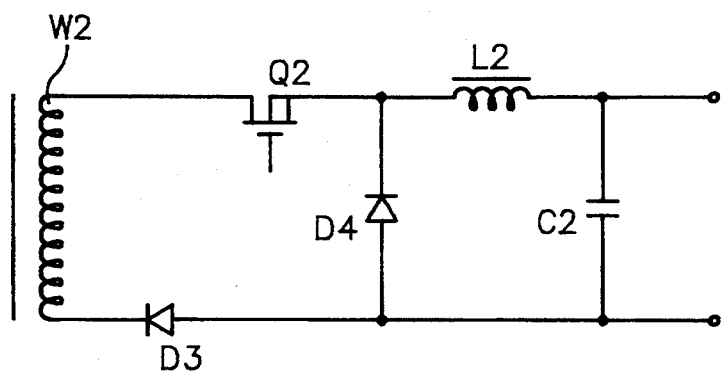
FIG. 9 is a circuit diagram depicting a secondary output circuit used in the embodiment of FIG. 6.

FIG. 9 shows another type of secondary output circuit 10 used, for example, in the embodiment of FIG. 6, and comprising choke coil L2, capacitor C2, diode D3 and FET Q2. The above explanation is of a so-called primary side control method wherein PWM circuit 23 is arranged on the primary side of transformer T. However, the invention can be practiced with a so-called secondary side method, wherein the PWM circuit 23 is arranged on the secondary side of transformer T. In the latter case, output Si of PWM circuit 23 may, for example, be isolated by a transformer (not shown) and supplied to primary switch Q1.

In addition to the advantages discussed with reference to the embodiment of FIG. 3, the FIG. 6 embodiment accrues the following advantages.

(A) Because the induction voltage VB (see FIG. 7(2)) from winding W6 is rectified and smoothed, and primary output voltage V1 is stabilized, a stable floating voltage Vcc (e.g. of 15 V) is obtained from auxiliary power supply 12. Also, since winding W5 and Winding W6 are connected in a flyback manner, in the period during which choke coil L1 is operating in an OFF state with respect to the primary output circuit 1, auxiliary power supply 12 operates so as to receive as an input the signals shown in FIG. 7(2). That is, even if auxiliary power supply 12 is connected thereto, it does not effect the stability of primary output voltage V1.

(B) Since signal Vsw, which serves as the basis for producing synchronized signal Vc, is taken from circuits other than transformer T, such as for example, choke coil L1, the synchronizing signal generator 11 can be made of low tolerance components. As a result, the switching power supply can be further miniaturized and even more than that shown in FIG. 3.

FIG. 10 specifically shows details of an auxiliary power source 12, as used, for example, in a FIG. 3 embodiment. The embodiment of FIG. 10 differs from that of FIG. 3 in the following manner.

(a) Auxiliary power supply 12, showing generally in FIG. 3, is shown in FIG. 10 as comprising winding W8 and constant voltage circuit 15.

(b) A starter circuit, comprising diode D10 and resistor R12, is used to start constant voltage circuit 15. Auxiliary power source 12 of the embodiment of FIG. 6 does not need a starter circuit since an inductance voltage VB is generated in winding W6 of choke coil L1 when operation of the primary output circuit 1 is started.

(c) In FIG. 10, signals from the two ends of winding W8 are shown as being received as signal Vsw by synchronizing signal generator 11. Synchronizing signal generator 11 may comprise the structure of FIG. 4.

(d) A starter circuit comprising resistor R11 supplies voltage Vin from capacitor C3 to auxiliary power supply 12.

Except for the above items (a)–(d), the structure of FIG. 10 is the same as that of FIG. 3.

In FIG. 10, winding W8 is wound about the core of choke coil L2 provided in the secondary output circuit 10. One end of winding W8 is connected to point A at the source side of FET Q2. Auxiliary power supply 12 obtains a DC voltage Vcc2 by regulating induction voltage VH from winding W8. Since the induction voltage from winding W8 can be decided by the number of turns in winding W8, DC voltage Vcc2 can be appropriately determined by the number of turns in winding W8, so that a voltage which is sufficient to drive FET Q2 is produced.

Consequently, since PWM circuit 13 can drive FET Q2 directly with output Ve, a signal delay which otherwise occurs in a drive transformer used in the conventional devices, such as shown in FIG. 1, is eliminated.

The FIG. 10 embodiment will now be further described by expounding on the differences between the FIG. 10 embodiment and the FIG. 3 embodiment.

Auxiliary power supply 12 of FIG. 10 obtains its power from choke coil L2 of secondary output circuit 10, that is through winding W8 wound about the core of choke coil L2, and one end thereof being connected to point A at the source side of FET Q2.

Synchronizing signal generator 11 receives as an input the induction voltage VH of winding W8, and outputs a sawtooth shaped voltage Vc which repeats a fixed gradient pattern between the time when switch Q1 is turned OFF, and the time when the switch Q1 is next turned OFF. The structure and operation of generator 11 have already been described with reference to FIG. 4.

Auxiliary power supply 12 of FIG. 10 differs from auxiliary power supply 12 of FIG. 6 in that a starter circuit is used, comprising diode D10 and resistor R12. The starter circuit is provided for the following reason.

In the embodiment of FIG. 10 when operation begins, FET Q2 is still in an OFF state. Thus, a voltage is not generated in choke coil L2, and a voltage VH is not generated in winding W8, and constant voltage circuit 15 cannot produce voltage Vcc2 which is to otherwise be supplied to PWM circuit 13. Thus, at the starting time, voltage Vo is received as an input from winding W2 of transformer T via diode D10 and resistor R12 and supplied to auxiliary power supply 12. From there, there is a produced a voltage Vcc2 of a given amount.

By means of voltage Vcc2 produced at the starting time, when PWM circuit 13 begins operation, FET Q2 begins its ON/OFF operaton. As a result, a voltage VH is induced in winding W8 of choke coil L2. When voltage VH from winding W8 gradually is increased, auxiliary power supply 12 produces not the voltage suppled from diode D10 and resistor R12, but the voltage Vcc2 from voltage VH from winding W8, whereby the starting procedure is completed.

Figure 13:
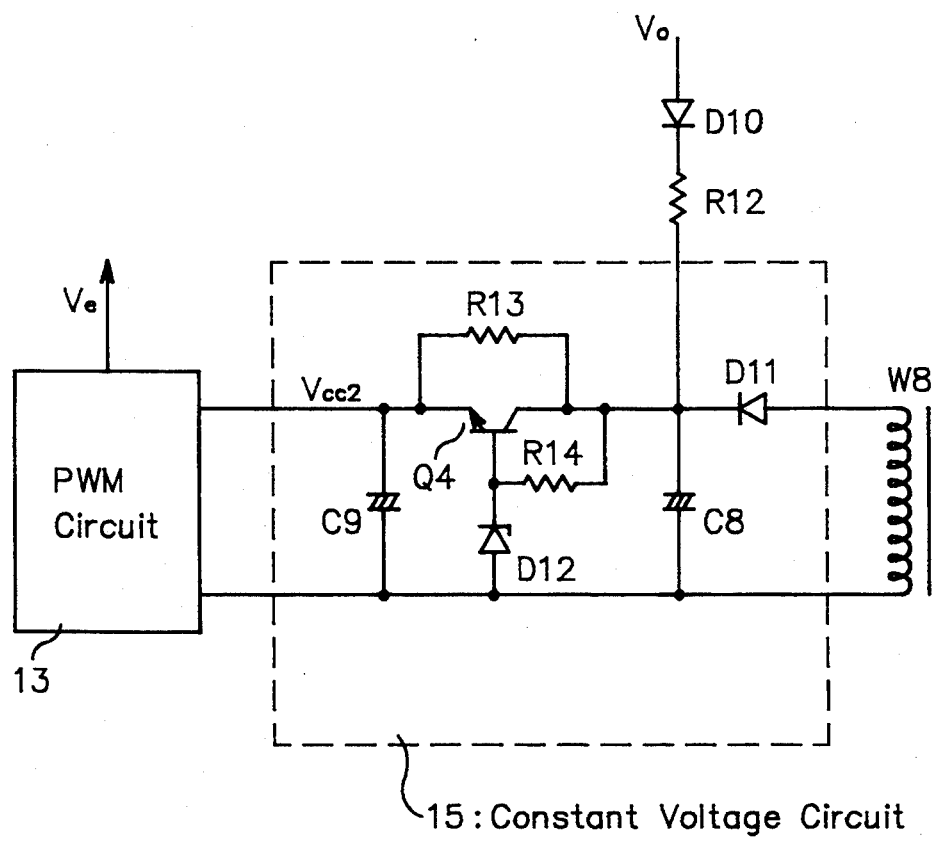
FIG. 13 is a circuit diagram depicting constant voltage circuit 15 used in the embodiment of FIG. 10.

FIG. 13 shows details of the auxiliary power supply 12 having the starter circuit (of diode D10 and resistor R12) as described above. In FIG. 13 diode D10, resistor R12, winding W8, constant voltage circuit 15, and PWM circuit are the same as in FIG. 10. The constant voltage circuit 15 comprises a diode D11, capacitors C8 and C9, a transistor Q4, a Zener diode D12, and resistors R13 and R14.

The circuit of FIG. 13 operates as follows. At the time of the starting operation when voltage VH is not generated in winding W8, transistor Q4 of constant voltage cirucit 15, is cut off because the collector potential is low.

At this time, as shown in FIG. 13, induction voltage Vo (see also FIG. 10) of winding W2 is rectified by diode D10 and applied via resistor R12 to constant voltage circuit 15. The rectified current flows along a channel from resistor R12 to resistor R13 to capacitor C9, and charges capacitor C9. Voltage Vcc2 of capacitor C9, by means of current from the starter circuit gradually rises, and puts PWM circuit 13 into an operating condition.

As a result, FET Q2 of FIG. 10 performs the ON/OFF operation, and an induction voltage is produced in winding W8. Consequently, the voltage of capacitor C8 increases, and transistor Q4 produces a set voltage Vcc2 from the voltage obtained from winding W8. Also, when the potential of capacitor C8 increases, diode D10 of the starter circuit reaches a reversed bias state and is cut OFF.

The operation of the FIG. 10 embodiment will now be described with reference to FIGS. 12(1)–12(3).

A further feature of the FIG. 10 embodiment is that a winding W8 is provided in choke coil L2, and that from such winding W8, a DC voltage Vcc2, which is higher in value that the voltage at point A, is produced.

Another feature is that a timing signal, which is the basis from which the synchronizing signal Vc is produced, is generated from induction voltage VH produced in winding W8.

Voltage VH has the wave form shown in FIG. 12(1) and is induced in winding W8. The periods defined by times t1 to t2, and t3 to t4, are the ON periods of primary switch Q1, and the period defined by t2 to t3 is the OFF period of switch Q1.

Because one end of winding W8 is connected to point A of FIG. 10, auxiliary power source 12 supplies to PWM circuit 13 a power source voltage Vcc2 which is higher in value than at point A, such value being the value of at least Vcc2. Accordingly, since PWM circuit 13 can apply a control signal Ve of a voltage approximately Vcc2 volts higher than that at point A to the gate of FET Q2, switch Q2 can be driven without the use of a drive transformer, such as needed in conventonal devices, such as shown by drive transformer T2 in FIG. 1.

Synchronizing signal generator 11 and PWM circuit 31 operate as follows. Pulse waveform VH shown in FIG. 12(1) is supplied to synchronizing signal generator 11. Pulse waveform VH describes the ON/OFF states of switch Q1. Synchronizing signal generator 11 recognizes the trailing edge of waveform VH, and holds the time when the primary switch Q1 is turned OFF until the next time when switch Q1 is again turned OFF. Generator 11 outputs a synchronizing signal Vc, which, in the time period shown in FIG. 12(2), repeats a fixed gradient pattern, ie form a sawtooth shaped waveform.

PWM circuit 13, as described above, carries out a large/small comparison of the changing reference signal Vk and the synchronizing signal Vc, and from such comparison produces a control signal Ve and controls the pulse width as shown in FIG. 12(3), with the control signal being applied to FET Q2 to cause it to be turned ON/OFF.

In the embodiment of FIG. 12, the timing signal which is the basis on which the synchronizing signal is produced (i.e. the ON/OFF signal applied to turne ON/OFF primary switch Q1) is taken from transformer T and is received as an input from choke coil L2. Hence, components used in the generator need not be of high tolerance.

Next, the operation of the entire embodiment of FIG. 10 will be described with reference to FIGS. 11(1)–11(6). First, the control operation is as follows. When DC voltage Vin increases, as shown in FIG. 11(1), the DC voltage is supplied to auxiliary power supply 22 via resistor R11. Auxiliary power supply 22 has the same structure and operation as auxiliary power supply 12 described above with reference to FIG. 13. Power supply 22 raises the output voltage Vcc1, as shown in FIG. 11(2), by means of the voltage supplied via resistor R11.

The correspondences of signals supplied to power supplies 12 and 22 will now be explained. Voltage Vo supplied to power supply 12 from the primary transformer T corresponds, in the auxiliary power supply 22, to the voltage Vin supplied via resistor R11. Since voltage Vin is a direct current, there is no need for a diode to be provided in the line connecting capacitor C3 and auxiliary power supply 22 and including resistor R11. Also, voltage VH from winding W8 of coil L2, supplied to the auxiliary power supply 12 corresponds, in auxiliary power supply 22, to the voltage from winding W4 wound about primary transformer T.

If output voltage Vcc1 of auxiliary power supply 22 is higher than the start voltage Vth1 of PWM circuit 23, the oscillation circuit 21 and PWM circuit 23 function and hence the primary switch Q1 is caused to begin the ON/OFF operation. Accordingly, since primary output circuit 1 begins to operate, voltage V1 increases, as shown in FIG. 11(3). Differential amplifier 24 receives as an input the primary output voltage V1 and set voltage Vt, and, as previously described, feeds a reference signal Vk' to PWM circuit 23. PWM circuit 23 performs the above mentioned operations. The primary output voltage V1 is stabilized when it becomes the same as set voltage Vt.

When voltage V1 increases, power is supplied to auxiliary power supply 22 from winding W4 and auxiliary power supply 22 is changed to a DC voltage Vin, and generates an output voltages Vcc1 from power supplied from winding W4. At this time, the power inflow from the DC voltage Vin to the auxiliary power supply is interrupted.

When primary output circuit voltage V1 rises, induction voltage Vo of secondary winding W2 of the primary transformer T also rises, as shown in FIG. 11(4). Induction voltage Vo is supplied to auxiliary power source 12 via diode D10 and resistor R12. The output voltage Vcc2 from constant voltage circuit 15, by means of the operation previously described with reference to FIG. 13, increases, as shown in FIG. 11(5). If the value of output voltage Vcc2 of auxiliary power supply 12 increases beyond start voltage Vth2 of PWM circuit 13, PWM circuit 13 begins to function, and switches FET Q2. Accordingly, the pulse power of voltage Vo from winding W2 is supplied to the smoothing circuit via FET Q2, and the secondary output voltage V2 increases, as shown in FIG. 11(6).

When the secondary output voltage V2 increases, floating power is supplied to constant voltage circuit 15 from winding W8, and constant voltage circuit 15 changes to induction voltage Vo and generates an output voltage Vcc2 from voltage VH supplied from winding W8. The flow of power from voltage Vo to constant voltage circuit 15, is blocked.

Secondary output voltage V2 is compared to set voltage Vs by differential amplifier 14 and the resultant reference voltage Vk is fed to PWM circuit 13, and the secondary output voltage V2 is thereby stabilized.

As described above, the primary circuit 1 and the secondary circuit 10; the auxiliary power supplies 12 and 22; the PWM circuits 13 and 23; and the differential amplifiers 14 and 24, can in each set comprise the same components. Also, FET Q2 can be driven directly by the output of the PWM circuit without requiring any insulation.

In addition to the advantages enjoyed by the embodiment of FIG. 3, the FIG. 10 embodiment enjoys the following advantages.

(1) Auxiliary power suply 12 of FIG. 10 obtains DC voltage Vcc2 by regulating induction voltage VH from winding W8 wound about coil L2 of secondary output circuit 10. As the power source of the auxiliary power supply 12, if another winding is wound about transformer T and power is obtained from that winding, the winding will otherwise require high insulation. However, in the invention, the winding W8 of FIG. 10 is wound instead about the core of choke coil L2. Thus, high insulation is not required.

(2) Signal Vsw, which is the basis on which the synchronizing signal is produced, is taken from circuits other than transformer T, that is from choke coil L2. Thus, synchronizing signal generator 11 can be constructed using low tolerance components, with the result that the switching power supply can be further miniaturized even more than that of the FIG. 3 embodiment.

Figure 14:
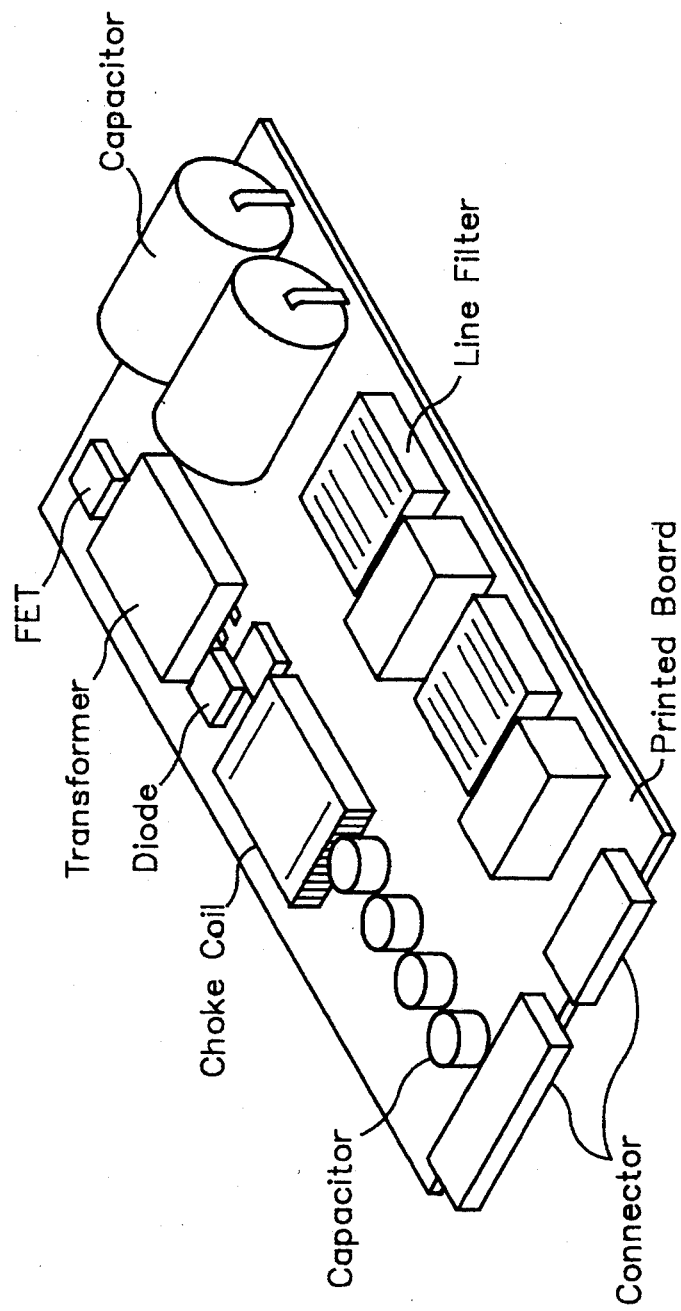
FIG. 14 is a perspective illustration depicting the mounting of the components of the invention.

FIG. 14 is a perspective diagram showing the mounted structure of the invention switching power supply, wherein a printed board is used. The printed board may be made from an aluminum-type high electrical and high heat conductive material with the upper surface thereof radiating heat which originates from the mounted components and with esssentially the entire lower part of the printed board serving as a heat sink. On the upper surface, the transformers, line filters, choke coils, and other magnetic components are mounted, as well as the electrical and smoothing capacitors. Furthermore, diodes, FETs, and other switching components from which radiation originates, are mounted on the upper surface. Apart from the foregoing, other components such as resistors are also mounted on the same side of the printed board. The diodes, FETs, resistors, etc, are surface mounted devices (called SMD) for mounting easily these devices on printed boards.

Advantageous, with such mounting, the automation of production and design are considerably advanced. Automation of the power supply is advanced by utilizing miniaturized components mounted on a one-sided printed board. Also, guidance of conveyor robots is easily manipulated and accomplished, and product mechanization is further enhanced. In terms of radiation design, the temperature distribution of the printed board lower surface was tested using a computer simulation model. With only the conditions of the casing for receiving the power supply given, it was possible to determine whether the rise in temperature of the power supply was within an allowable range. As to EMI countermeasures, since the floating capacity can be readily measured beforehand, the radiated electromagnetic waves can be forecast accurately by computer simulation and EMI countermeasures can be easily developed by simple practical tests. Furthermore, as to vibration countermeasures, the heavy magnetic components are in direct contact with the upper surface of the printed board. Thus, the center of gravity is low and earth quake resistance is improved. In this manner, there is the advantage of ease of design in view of such factors as radiation, EMI, vibrations, etc.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A switching power supply for controlling the duty ratio of switching to equalize a first fixed voltage and a primary output voltage obtained by switching a primary switching means provided at a primary side of a transformer and smoothing, by means of a first choke coil, a rectified waveform of a voltage induced in a first winding of a secondary side of said transformer, said switching power supply comprising:

a second winding provided at the secondary side of said transformer;

smoothing circuit means for receiving a rectified waveform of an output from said second winding, for smoothing the rectified waveform, and for producing a secondary output voltage therefrom;

switching element means for receiving said rectified waveform from said second winding and for controlling the amount of current supplied to said smoothing circuit means by means of an ON/OFF operation thereof;

auxiliary power supply means for generating a direct current voltage having a voltage level higher than a potential at a source point of said switching element means and capable of switching said switching element means;

synchronizing signal generator means for detecting the timing at which said primary switching means is turned OFF, and for generating a synchronizing signal having a sawtooth shaped waveform which repeats at a fixed gradient from a time when said primary switching means is turned OFF to a time when said primary switching means is again turned OFF;

differential amplifier means for receiving as inputs said secondary output voltage from said smoothing circuit means and a second fixed voltage, and for comparing the values thereof, and for outputting a reference signal having a value corresponding to a difference between said secondary output voltage and said second fixed voltage; and pulse width modulation circuit means for utilizing as a power source voltage direct current voltage obtained from said auxiliary power supply means, and for receiving as inputs said synchronizing signal and said reference signal, and for comparing said synchronizing signal and said reference signal, and for supplying to said switching element means a signal resulting from said comparing.

2. The power supply of claim 1, wherein said synchronizing signal generator means receives an induction voltage from said second winding as an input and detects the timing at which said primary switching means is turned OFF from said induction voltage, and generates said synchronizing signal.

3. The power supply of claim 1, wherein said auxiliary power supply means comprises:

a third winding wound about a core of said first choke coil; and rectifying and smoothing circuit means comprising a first output terminal connected to said source point of said switching element means, and a second output terminal connected to said pulse width modulation circuit means, for rectifying and smoothing a voltage induced in said third winding and for producing a direct current voltage therefrom.

4. The power supply of claim 3, wherein said synchronizing signal generator receives an induction voltage from said third winding as an input, and detects said time when said primary switching means is turned OFF from said induction voltage, and generates said synchronizing signal.

5. The power supply of claim 1, wherein said rectifying and smoothing circuit means comprises a smoothing circuit means including a second choke coil for smoothing said rectified waveform received as an input, and for producing said secondary output voltage; and wherein said auxiliary power supply means comprises a third winding wound about a core of said second choke coil, said third winding having one terminal connected to said source point of said switching element means; and a fixed voltage circuit means for regulating a signal induced in said third winding, and for producing said direct current voltage and supply said direct current voltage to said pulse width modulation circuit means.

6. The power supply of claim 5, wherein said synchronizing signal generator means receives an induction voltage from said third winding as an input, and detects said time when said primary switching means is turned OFF from said induction voltage, and generating said synchronizing signal.

* * * * *